(12) United States Patent
Natsume et al.

(10) Patent No.: US 11,993,313 B2
(45) Date of Patent: May 28, 2024

(54) LOWER STRUCTURE OF VEHICLE

(71) Applicant: MAZDA MOTOR CORPORATION, Hiroshima (JP)

(72) Inventors: Hirotaka Natsume, Hiroshima (JP); Kazuhiro Kageyama, Hiroshima (JP); Daisuke Tsuji, Hiroshima (JP); Shuang Gao, Hiroshima (JP); Yoshie Nishimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 216 days.

(21) Appl. No.: 17/711,276

(22) Filed: Apr. 1, 2022

(65) Prior Publication Data
US 2022/0379967 A1    Dec. 1, 2022

(30) Foreign Application Priority Data

May 25, 2021   (JP) ................................ 2021-087359

(51) Int. Cl.
*B62D 25/20* (2006.01)
*B60K 1/04* (2019.01)
(Continued)

(52) U.S. Cl.
CPC ............ *B62D 25/2036* (2013.01); *B60K 1/04* (2013.01); *B60L 3/0007* (2013.01);
(Continued)

(58) Field of Classification Search
CPC .............. B62D 25/025; B62D 25/2036; B62D 21/157; B60K 1/04; B60K 2001/0438; B60Y 2306/01
(Continued)

(56) References Cited

U.S. PATENT DOCUMENTS 8,276,697 B2 * 10/2012 Takasaki ............... B60L 3/0007
                                                    903/952
2020/0023905 A1    1/2020 Kawase
2021/0268886 A1 *  9/2021 Nakamura .......... H01M 50/289

FOREIGN PATENT DOCUMENTS

CN    106030854 A   * 10/2016   ............ B60L 3/0007
JP    2020-11640 A    1/2020

OTHER PUBLICATIONS

Translation of CN 106030854 (Year: 2016).*

* cited by examiner

*Primary Examiner* — Dennis H Pedder
(74) *Attorney, Agent, or Firm* — Studebaker & Brackett PC

(57) ABSTRACT

There are provided a pair of side sills provided at both outward sides, in a vehicle width direction, of a vehicle body and extending in a vehicle longitudinal direction, first and second battery units provided below a floor panel on respective inward sides, in the vehicle width direction, of and adjacently to the side sills, the first and second battery units being spaced apart from each other in the vehicle width direction, and a connecting member interconnecting the first and second battery units. The connecting member comprises a vehicle-width-direction connection portion to interconnect the first and second battery units so as to transmit a load, in the vehicle width direction, therebetween and plural deformation promotion portions provided adjacently to the vehicle-width-direction connection portion so as to cause deformation at the vehicle-width-direction connection portion when receiving the load caused by a vehicle side collision.

13 Claims, 13 Drawing Sheets

(51) Int. Cl.
  *B60L 3/00* (2019.01)
  *B62D 21/15* (2006.01)
  *B62D 25/02* (2006.01)
(52) U.S. Cl.
  CPC ......... *B62D 21/157* (2013.01); *B62D 25/025* (2013.01); *B60K 2001/0438* (2013.01)
(58) Field of Classification Search
  USPC .......... 296/204, 209, 187.12, 20, 30, 193.07
  See application file for complete search history.

LOWER STRUCTURE OF VEHICLE

BACKGROUND OF THE INVENTION

The present invention relates to a lower structure of a vehicle in which a battery unit is provided below a vehicle floor.

Conventionally, as disclosed in Japanese Patent Laid-Open Publication No. 2020-11640 (US 2020/0023905 A1), a structure of BEV (battery electric vehicle) which is configured such that a battery unit is provided below a vehicle floor and a side-collision load caused in a vehicle side collision is absorbed by a side sill as a vehicle-body reinforcing member which is provided at an outward side, in a vehicle width direction, of a vehicle floor panel, is known.

In a case of PHEV (plug-in hybrid electric vehicle) which has an exhaust pipe of an engine, it is required that right-and-left battery units are separately disposed on both sides, in the vehicle width direction, of a tunnel floor portion which accommodates the exhaust pipe therein.

In this structure, in a collision case, such as a pole side collision, where a collision load is inputted, toward an inward side, in the vehicle width direction, of the vehicle, to a front side of the battery unit which is positioned on a forward side of a gravity center of the battery unit, the side sill is deformed in a V shape in a vehicle plan view and the vehicle side-collision load is inputted to the battery unit from a local point in front of its gravity center, so that the front side of the battery unit may be forced to be rotationally displaced inwardly, in the vehicle width direction, of the vehicle.

Herein, in a case where a high-voltage cable to interconnect the battery unit and a high-voltage device provided in front of the battery unit, such as an inverter, is arranged, there is a concern that the high-voltage cable may be drawn strongly when the above-described inward rotational displacement of the front side of the battery unit happens.

In order to solve the above-described concern, a structure in which a connecting member to transmit the side-collision load in an opposite direction, in the vehicle width direction, thereto is provided and the right-and-left battery units are interconnected by this connecting, thereby stretching between the both battery units by means of the connecting member, is possibly considered.

However, in a case where the rigidity of the above-described connecting member is too high, there may occur a new problem in that the battery unit where the side-collision load is inputted is caught between the connecting member and the side sill, so that the battery unit is improperly deformed.

SUMMARY OF THE INVENTION

Accordingly, an object of the present invention is to provide a lower structure of a vehicle which can suppress the battery unit from being caught between the connecting member and the side sill, thereby properly suppressing the deformation of the battery unit.

The present invention is a lower structure of a vehicle, comprising a pair of side sills provided at both outward sides, in a vehicle width direction, of a vehicle body and extending in a vehicle longitudinal direction, first and second battery units provided below a floor panel on respective inward sides, in the vehicle width direction, of and adjacently to the side sills, the first and second battery units being spaced apart from each other in the vehicle width direction, and a connecting member interconnecting the first and second battery units, wherein the connecting member comprises a vehicle-width-direction connection portion to interconnect the first and second battery units so as to transmit a load, in the vehicle width direction, therebetween and plural deformation promotion portions provided adjacently to the vehicle-width-direction connection portion so as to cause deformation at the vehicle-width-direction connection portion when receiving the load caused by a vehicle side collision. Herein, the above-described deformation promotion portion may be constituted by a bead.

According to the present invention, the vehicle-width-direction connection portion of the connection member transmits the side-collision load toward the opposite side, in the vehicle width direction, of the vehicle body and also the vehicle-width-direction connection portion is caused to be bending-deformed by the plural deformation promotion portions, whereby the side-collision energy can be absorbed and the deformation of the battery unit can be suppressed.

Further, since the plural deformation portions are provided, the vehicle-width-direction connection portion is deformed at plural points, in the vehicle width direction, thereof in the vehicle side collision. Consequently, even if the battery unit is relatively displaced in a vertical direction, reduction of load input to the battery unit can be attained without stretching of the connecting member. That is, the battery unit can be suppressed from being caught between the connecting member and the side sill, so that the deformation of the battery unit can be suppressed properly.

In an embodiment of the present invention, each of the plural deformation promotion portions comprises a front part and a rear part which are respectively located on a forward side and a rearward side, in the vehicle longitudinal direction, of the vehicle-width-direction connection portion at the same position, in the vehicle width direction, of the connecting member.

According to this embodiment, a stress is concentrated on the deformation promotion portions effectively, so that the vehicle-width-direction connection portion can be bending-deformed securely, thereby absorbing the side-collision energy.

In another embodiment of the present invention, the vehicle-width-direction connection portion comprises plural ridge-line portions extending in the vehicle width direction.

According to this embodiment, since the ridge-line portions are paths where the side-collision load is transmitted, the absorption quantity of the side-collision energy can be improved by bending the ridge-line portions.

In another embodiment of the present invention, the deformation promotion portion is constituted by a longitudinal bead protruding downwardly and extending in the vehicle longitudinal direction.

According to this embodiment, since the deformation promotion portion is constituted by the longitudinal bead, the absorption effect of the side-collision energy can be attained properly with a simple structure.

In another embodiment of the present invention, the deformation promotion portion comprises a rigidity-changing portion where rigidity against an input applied in the vehicle width direction which is caused by the vehicle side collision changes at a rear side thereof, and the deformation promotion portion is integrally connected to the rigidity-changing portion.

According to this embodiment, since the rear side of the deformation promotion portion is integrally connected to the rigidity-changing portion, the stress by the input of the side-collision load can be easily concentrated on a point where the deformation promotion portion is connected to the rigidity-changing portion, i.e., on the point where the rigidity changes, so that this rigidity-changing point can function effectively as a deformation causing point.

In another embodiment of the present invention, a rearward extension portion which is provided at a rear side of the vehicle-width-direction connection portion comprises a notch portion extending in the vehicle width direction, and the deformation promotion portion is integrally connected to the notch portion.

This embodiment provides the following effect. That is, in a case where the connecting member is bending-deformed, it is necessary that a further rear portion of the rearward extension portion is also bent if no notch portion exists, so that the quantity of energy for bending becomes large. According to this embodiment, however, since the notch portion exists, the connecting member can be bent easily without requiring the large energy quantity. Consequently, the stretching of the connecting member can be suppressed without hindering the appropriate bending of the connecting member.

In another embodiment of the present invention, the deformation promotion portion which is connected to a front side of the vehicle-width-direction connection portion is formed in a slope shape such that a rear side thereof protrudes downwardly more.

According to this embodiment, the aerodynamic performance can be improved while attaining the bending deformation of the vehicle-width-direction connection portion by means of the deformation promotion portion. Specifically, underfloor traveling air added to a front-end side portion of the deformation promotion portion can be guided rearwardly and downwardly along the slope shape of the deformation promotion portion while suppressing the underfloor traveling air from flowing into a space above the connecting member, so that the aerodynamic performance can be improved.

Herein, it is preferable that the above-described rigidity-changing portion be constituted by a bead which extends, in the vehicle width direction, from an end portion, in the vehicle width direction, of the vehicle-width-direction connection portion to the deformation promotion portion and has an upward-convex structure which projects upwardly.

The present invention will become apparent from the following description which refers to the accompanying drawings.

DETAILED DESCRIPTION OF THE INVENTION

Figure 1:
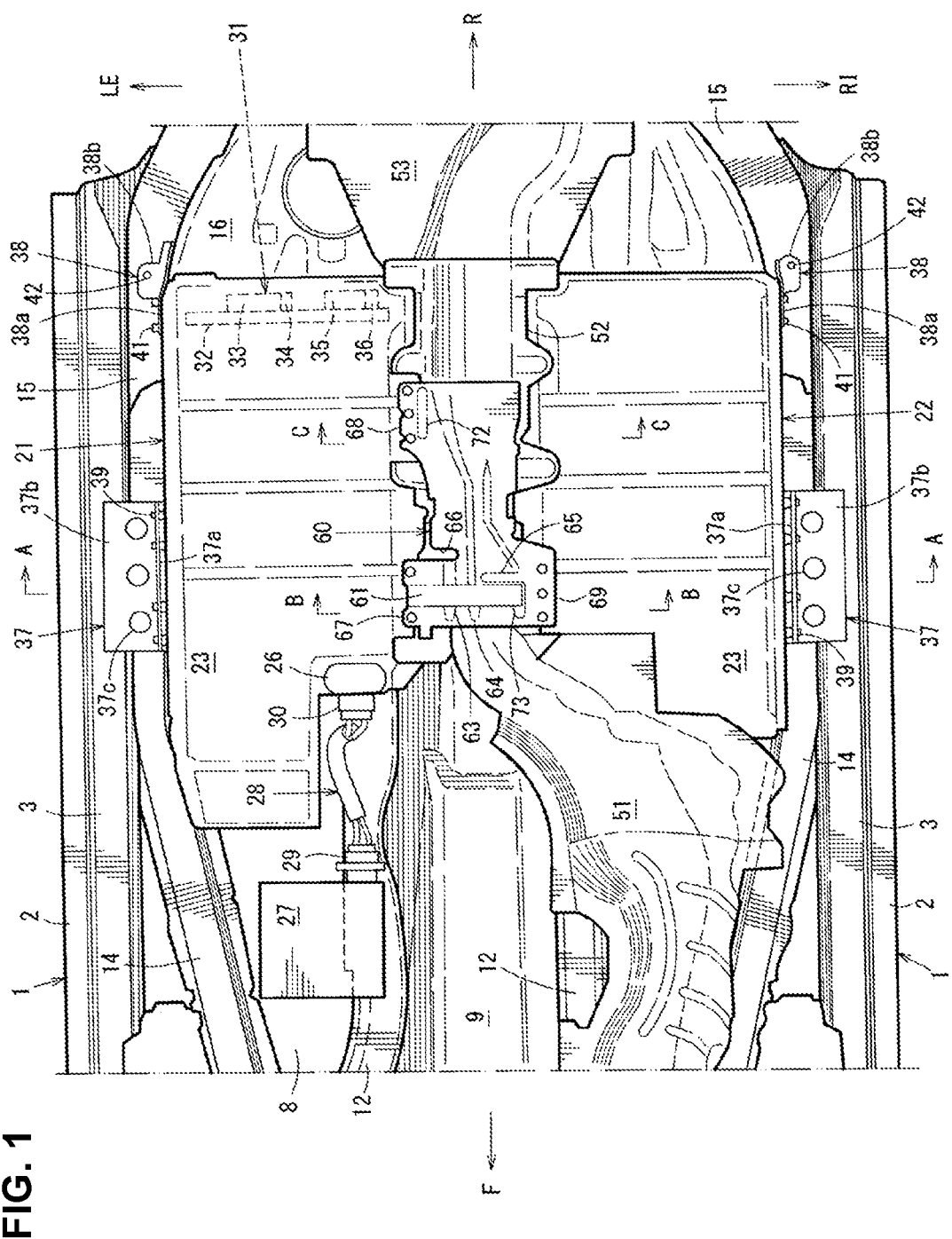
FIG. 1 is a bottom view of a major part of a vehicle which has a lower structure of the present invention.
Figure 2:
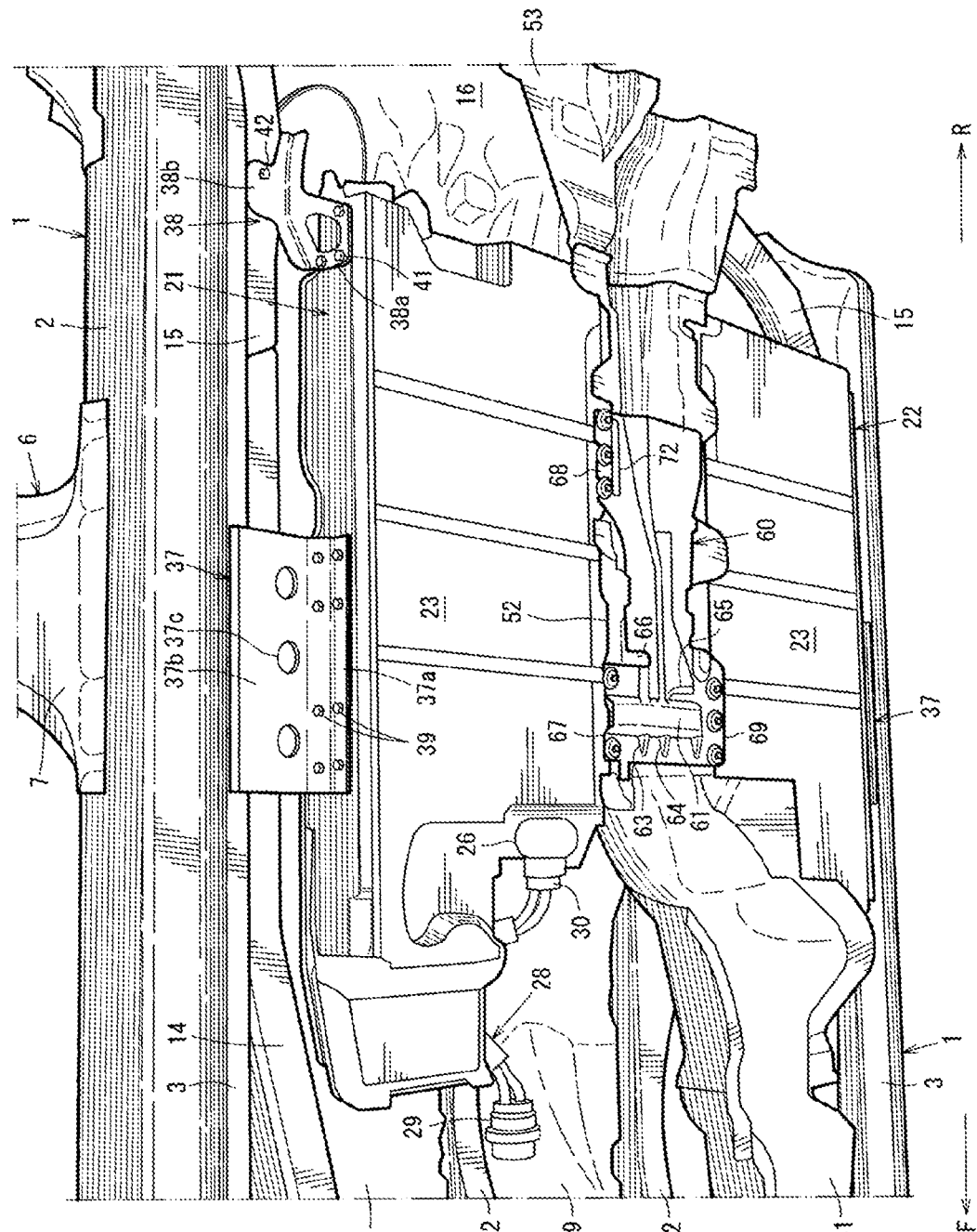
FIG. 2 is a perspective view of the structure of FIG. 1, when viewed from a vehicle downward side.

An embodiment of the present invention will be described specifically referring to the drawings. The drawings shows a lower structure of a vehicle. FIG. 1 is a bottom view of a major part of a vehicle which has a lower structure of the present invention, specifically a bottom view of a part of the lower structure which corresponds to a center pillar and its surrounding area, FIG. 2 is a perspective view of the structure of FIG. 1, when viewed from a vehicle downward, FIG. 3 is a sectional view taken along line A-A of FIG. 1, and FIG. 4 is a sectional view taken along line B-B of FIG. 1.

Figure 5:
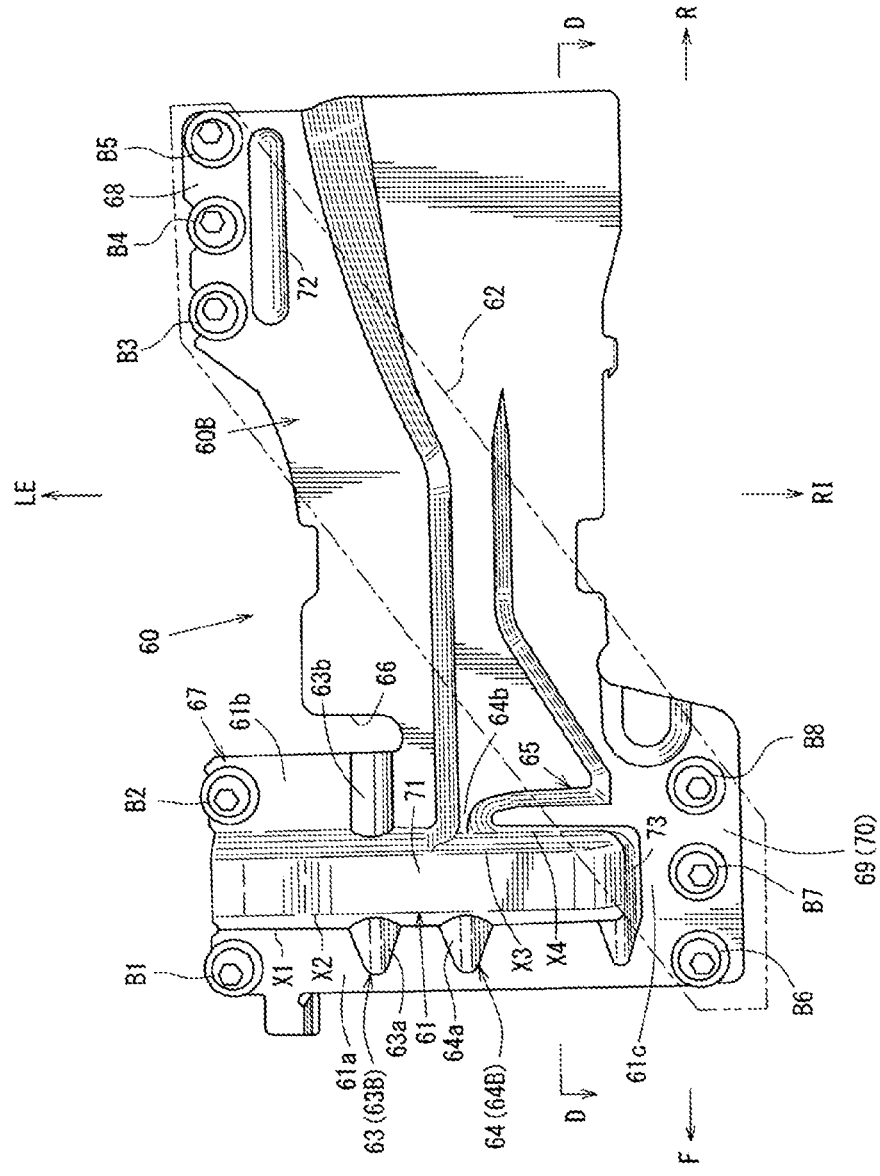
FIG. 5 is a bottom view of a connecting member.
Figure 6:
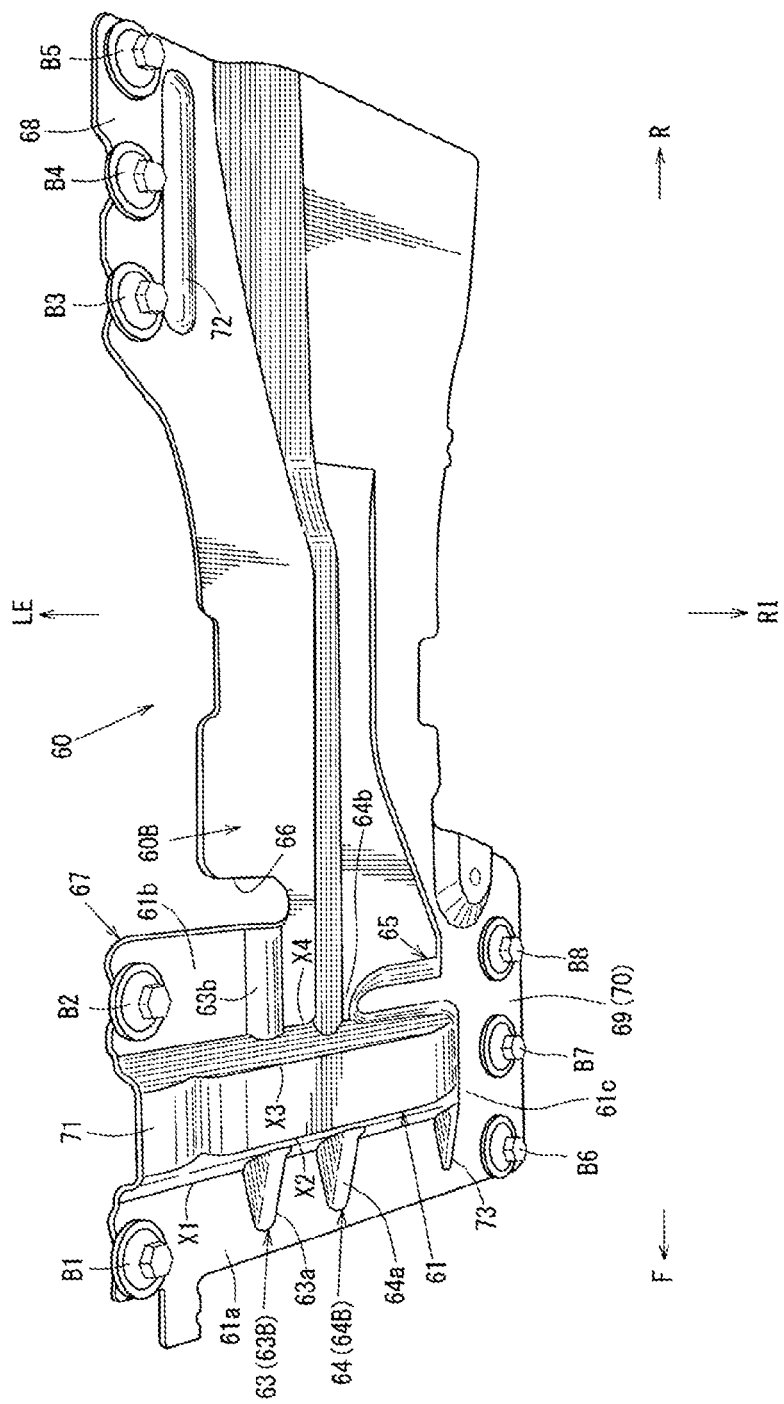
FIG. 6 is a bottom perspective view of the connecting member.
Figure 7:
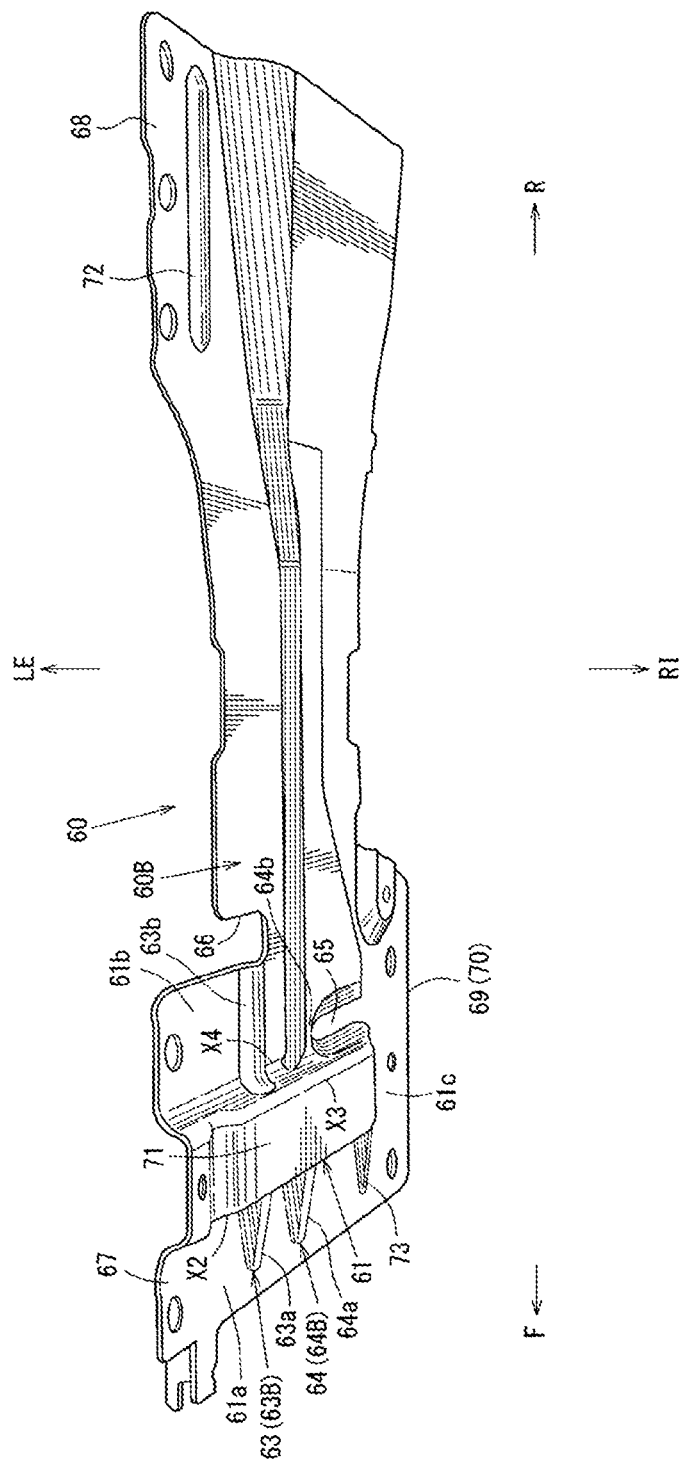
FIG. 7 is a bottom perspective view of the connecting member, which shows with a different viewing angle from FIG. 6.
Figure 8:
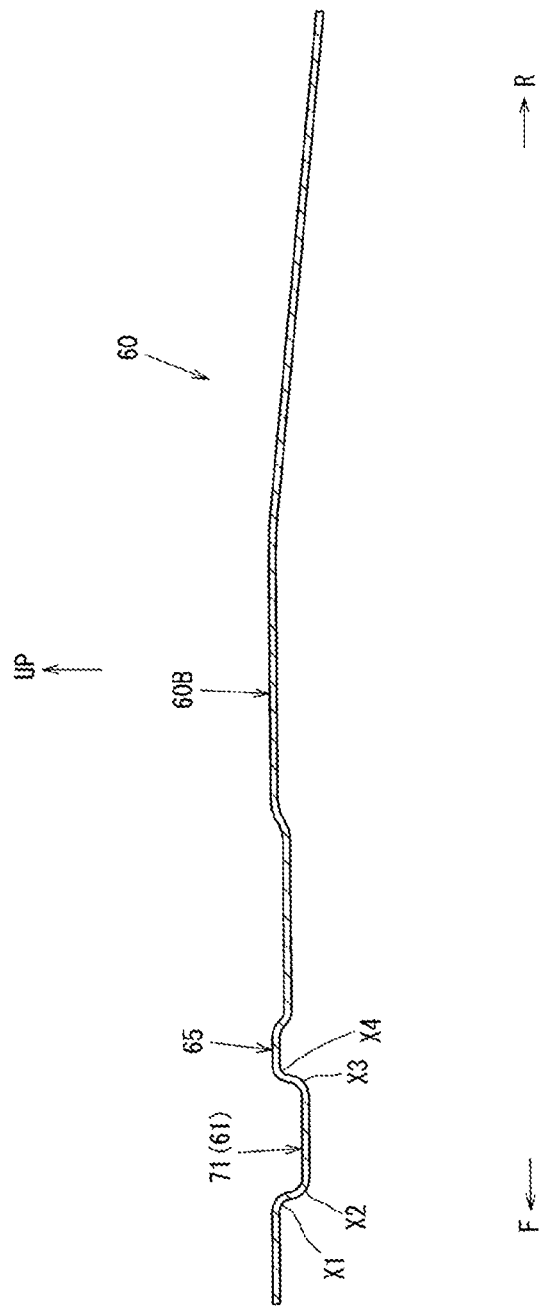
FIG. 8 is a sectional view taken along line D-D of FIG. 5.

Further, FIG. 5 is a bottom view of a connecting member, FIG. 6 is a bottom perspective view of the connecting member, FIG. 7 is a bottom perspective view of the connecting member, which shows with a different viewing angle from FIG. 6, and FIG. 8 is a sectional view taken along line D-D of FIG. 5.

In the figures, an arrow F shows a vehicle forward side, an arrow R shows a vehicle rearward side, an arrow LE shows a leftward side in a vehicle width direction, an arrow RI shows a rightward side in the vehicle width direction, and an arrow UP shows a vehicle upward side.

Figure 3:
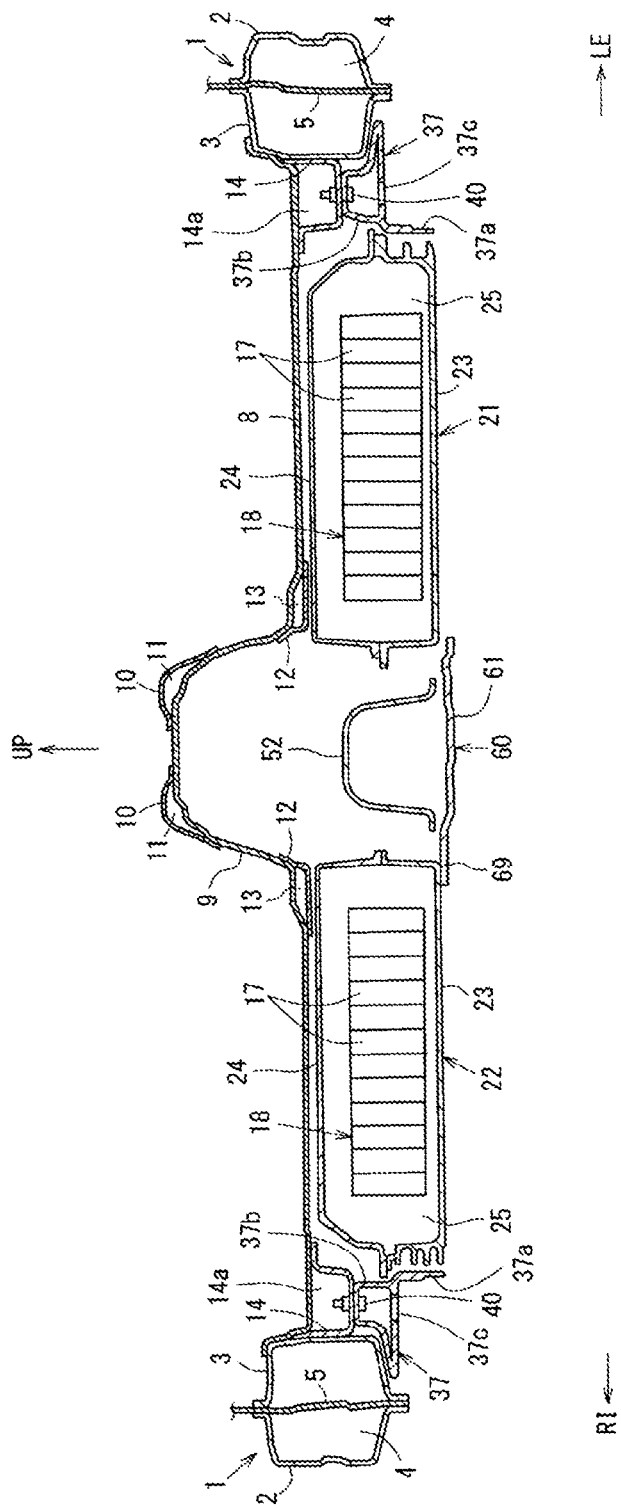
FIG. 3 is a sectional view taken along line A-A of FIG. 1.
Figure 4:
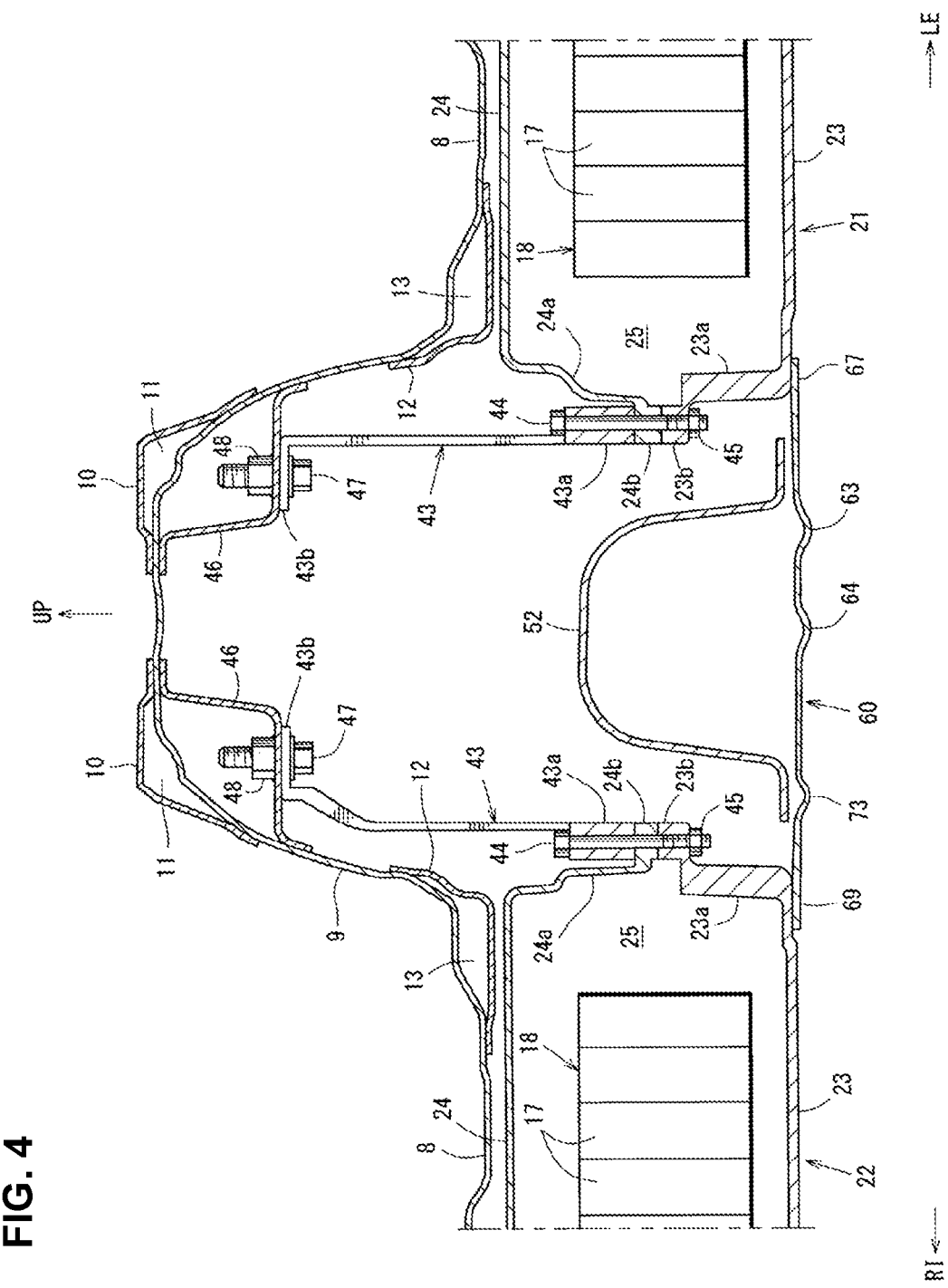
FIG. 4 is a sectional view taken along line B-B of FIG. 1.

As shown in FIG. 3, a pair of side sills 1 extending in a vehicle longitudinal direction are provided at right-and-left both outward sides, in the vehicle width direction, of a vehicle body as a vehicle-body reinforcing member. Each of the side sills 1 has a side-sill closed-cross section 4 extending in the vehicle longitudinal direction which is formed by a side sill outer 2 and a side sill inner 3 which are fixedly joined together. In the present embodiment, a center pillar inner 5 is held between the side sill outer 2 and the side sill inner 3 at an center-pillar arrangement point.

Herein, a side sill reinforcement may be held between the side sill outer 2 and the side sill inner 3 in place of the above-described structure.

As shown in FIGS. 2 and 3, a center pillar 6 which has a center-pillar closed-cross section extending in a vehicle vertical direction which is formed by a center pillar inner 5 (see FIG. 3) and a center pillar outer 7 (see FIG. 2) which are fixedly joined together is a vehicle-body reinforcing member.

As shown in FIG. 7, a floor panel 8 which forms a floor of a vehicle cabin is provided between the both side sill inners 3 of the right-and-left side sills 1, and a tunnel portion 9 is provided at a central portion, in the vehicle width direction, of the floor panel 8. This tunnel portion 9 may be formed integrally with or separately from the floor panel 8, wherein the tunnel portion 9 may be attached to the floor panel 8.

As shown in FIGS. 3 and 4, a pair of tunnel reinforcements 10 (so-called high mount backbone frames) which protrude upwardly and extend in the vehicle longitudinal direction are attached to upper right-and-left corner portions of the tunnel portion 9, whereby a pair of tunnel upper closed-cross sections 11 extending in the vehicle longitudinal direction are formed between the tunnel reinforcements 10 and the tunnel portion 9, thereby improving the tunnel rigidity.

As shown in FIGS. 3 and 4, a pair of tunnel side members 12 are attached to lower right-and-left corner portions of the tunnel portion 9, whereby a pair of tunnel-lower closed-cross sections 13 extending in the vehicle longitudinal direction are formed between the tunnel side members 12 and the tunnel portion 9, thereby improving the tunnel rigidity.

As shown in FIGS. 1 and 2, a pair of underfloor frames 14 having an inverse-hat shaped cross section are attached at both sides of the floor panel 8 and on respective inward sides, in the vehicle width direction, of the right-and-left side sill inners 3, whereby a pair of floor-frame closed-cross sections 14a (see FIG. 3) extending in the vehicle longitudinal direction are formed between the floor panel 8 and the underfloor frames 14, thereby improving the floor rigidity. Each of the underfloor frames 14 extends in the vehicle longitudinal direction from a front end portion of the floor panel 8 to a portion of the floor panel 8 which corresponds to a rear portion of the center pillar 6.

As shown in FIGS. 1 and 2, a pair of right-and-left rear side frames 15 which extend in the vehicle longitudinal direction from a rear end of the underfloor frame 14 to a rear end panel (not illustrated) are provided. The rear end frames 15 are vehicle-body reinforcing members which are disposed on the both sides, in the vehicle width direction, of a rear seat pan 16 and a baggage-room floor, and a pair of rear side-frame closed-cross section extending in the vehicle longitudinal direction are formed between the rear side frames 15 and a rear floor (the rear seat pan 16, the baggage-room floor).

Herein, as shown in FIG. 1, a rear portion of the side sill 1 and a front portion of the rear side frame 15 are configured to overlap each other in the vehicle width direction. The present embodiment exemplifies PHEV (plug-in hybrid electric vehicle) as the vehicle, wherein the above-described tunnel portion 9 is formed in order to guide exhaust gas from an engine installed at a front section of the vehicle toward a vehicle rearward side.

As shown in FIG. 3, a first battery unit 21 and a second battery unit 22 are provided below the floor panel 8 on the both inward sides, in the vehicle width direction, of and adjacently to the side sills 1, wherein the first and second battery units 21, 22 are spaced apart from each other in the vehicle width direction, interposing the tunnel portion 9 therebetween.

Each of the first and second battery units 21, 22 comprises a battery 18 which is composed of plural battery modules 17, a battery tray 23 which covers below the battery 18 and has a recess-shaped cross section, and a battery cover 24 which covers over the battery 18 and has an inverse recess-shaped cross section.

That is, each of the first and second battery units 21, 22 is arranged such that the battery 18 is supported on the battery tray 23 and disposed in a battery storage space 25 which is enclosed by the battery tray 23 and the battery cover 24. Further, a bottom face of the battery tray 23 of each of the battery units 21, 22 is configured to be substantially flat from viewpoints of the aerodynamic performance (see FIG. 3).

As shown in FIGS. 1 and 2, a connector joint portion 26 is provided at a front portion of an inward side, in the vehicle width direction, of the first battery unit 21, and a high-voltage cable 28 interconnects an inverter 27 which is provided in front of the first battery unit 21 as a high-voltage device and the connector joint portion 26.

The high-voltage cable 28 has an inverter-side connecter 29 and a battery-side connecter 30 at its longitudinal both ends, the inverter-side connector 29 is connected to the inverter 27, and the battery-side connector 30 is connected to the connector joint portion 26. The high-voltage cable 28 is arranged such that it extends forwardly from a front portion of the first battery unit 21.

The inverter 27 is an electric-power converter which obtains AC power from DC power of the battery 18, which is provided to drive vehicle wheels by means of an AC motor in order to improve the efficiency of the motor drive system.

As shown in FIG. 1, a relay portion 31 to switch an electric circuit of the vehicle is fixed to at least one of the first battery unit 21 and the second battery unit 22. In the present embodiment, plural relays 33, 34, 35, 36 are attached to a back face of a junction box 32 which is provided to rise at a rear portion of the left-side first battery unit 21, and the above-described relay portion 31 is constituted by these relays 33-36.

The relay 33 is a minus (negative)-side quick charging relay, the relay 34 is a plus (positive)-side quick charging relay, the relay 35 is a minus (negative)-side normal charging relay, and the relay 36 is a plus (positive)-side normal charging relay. However, the kinds of these relays 33-36 are not to be limited to the above-described relays.

Respective outward sides, in the vehicle width direction, of the first battery unit 21 and the second battery unit 22, which are heavy objects, are fixed to the vehicle body by respective middle fixing members 37 and respective rear fixing members 38 which are shown in FIGS. 1-3. Further, respective inward sides, in the vehicle width direction, of the first battery unit 21 and the second battery unit 22 are hung at the vehicle body by respective hanging members 43 (see FIG. 4) which will be described later.

As shown in FIGS. 1-3, the above-described middle fixing members 37 fix respective middle portions, in the vehicle longitudinal direction, of the battery units 21, 22 to the vehicle body, and as shown in FIGS. 1-3, each of the middle fixing members 37 has a battery-side attachment portion 37a and a vehicle-body-side attachment portion 37b.

The battery-side attachment portion 37a of the middle fixing member 37 is fixedly fastened to a side face of the battery tray 23 of each of the battery units 21, 22 by using plural fastening members 39, such as bolts and nuts (see FIGS. 1 and 2). Further, the vehicle-body-side attachment portion 37b is fixedly fastened to a lower face of the underfloor frame 14 by using plural fastening members 40, such as bolts and nuts (see FIG. 3).

The above-described middle fixing member 37 is made of an aluminum or aluminum-alloy extrusion molded article, the battery-side attachment portion 37a has a solid structure, and the vehicle-body-side attachment portion 37b has a hollow structure.

Further, opening portions 37c to insert the fastening members 40 therein are formed at a lower face portion of the vehicle-body-side attachment portion 37b having the hollow structure in order that an upper face portion of the vehicle-body-side attachment portion 37b having the hollow structure is fastened to the underfloor frame 14.

In the present embodiment wherein the bolt and nut are used as the fastening member 40, the nut is previously welded to an upper face of a bottom portion of the underfloor frame 14, and the bolt which is inserted through the opening portion 37c of the vehicle-body-side attachment portion 37b is threaded into the nut, whereby the vehicle-body-side attachment portion 37b is attached to the underfloor frame 14. Further, the above-described middle fixing member 37 serves as an energy-absorbing member to absorb a side-collision load in a vehicle side collision as well.

Meanwhile, the rear fixing member 38 fixes the respective rear portions, in the vehicle longitudinal direction, of the battery units 21, 22 to the vehicle body, which has a battery-side attachment portion 38a and a vehicle-body-side attachment portion 38b as shown in FIGS. 1 and 2.

As shown FIGS. 1 and 2, the battery-side attachment portion 38a of the rear fixing member 38 is fixedly fastened to a rear side face of the battery tray 23 of each of the battery units 21, 22 by using plural fastening members 41, such as bolts and nuts. Further, the vehicle-body-side attachment portion 38b is fixedly fastened to a lower face of the rear side frame 15 as a vehicle-body frame by using plural fastening members 42, such as bolts and nuts. The inward sides, in the vehicle width direction, of the first battery unit 21 and the second battery unit 22, which are heavy objects, are hung at the vehicle body by the respective hanging members 43 shown in FIG. 4.

FIG. 4 is a sectional view taken along line B-B of FIG. 1, the position of line B-B of FIG. 1 corresponds to a front side of the center pillar 6, and the position of line C-C of FIG. 1 corresponds to a rear side of the center pillar 6. Further, while FIG. 4 shows only a structure at the line B-B position, the battery units 21, 22 are hung at the vehicle body by the hanging members 43 at the C-C line position as well as the line B-B position. Therefore, illustration of its sectional view taken along line C-C is omitted here.

As shown in FIG. 4, each of the above-described right-and-left hanging members 43, 43 has a lower battery-side attachment portion 43a and an upper vehicle-body-side attachment portion 43b.

As shown in FIG. 4, a flange portion 23b is integrally formed at an upper end of a side wall portion 23a which extends upwardly from an inward side, in the vehicle width direction, of the battery tray 23, and a flange portion 24b is integrally formed at a lower end of a side wall portion 24a which extends downwardly from an inward side, in the vehicle width direction, of the battery cover 24.

These three portions 43a, 24b, 23b are integrally fastened together by a long bolt 44 and a nut 45 in a state where the flange portions 24b, 23b contact each other in a vertical direction and the battery-side attachment portion 43a is overlapped onto these two portions 24b, 23b. That is, the three portions 43a, 24b, 23b are fixedly fastened by the bolt 44 and the nut 45.

As shown in FIG. 4, a bracket 46 is fixedly welded such that it extends between an upper lower face of the tunnel portion 9 and a side inner face of the tunnel portion 9 at an upper position which corresponds to a battery-hanging position of the hanging member 43. The vehicle-body-side attachment portion 43b which is positioned at the upper side of the hanging member 43 is fixedly fastened to an attachment seat face of the bracket 46 by using a fastening member, such as a bolt 47 and a nut 48.

In the present embodiment, the nut 48 is previously welded to an upper surface of the attachment seat face of the bracket 46 and then the bolt 47 is fixedly fastened to the nut via the vehicle-body-side attachment portion 43b of the hanging member 43, whereby the vehicle-body-side attachment portion 43b is fastened to the attachment seat face of the bracket 46.

Thus, the inward side, in the vehicle width direction, of each of the battery units 21, 22 is hung at the tunnel portion 9, a vehicle-body reinforcing member, at plural longitudinally-spaced points of a middle portion, in the vehicle longitudinal direction, thereof by means of the hanging member 43.

Herein, as shown in FIGS. 1-4, there are provided a front insulator 51, a middle insulator 52, and a rear insulator 53 which are positioned below the vehicle lower part and cover over an exhaust passage made of an exhaust pipe. These split parts of the insulators 51, 52, 53 are attached to the vehicle body such that these members 51, 52, 53 are continuous in the vehicle longitudinal direction.

As shown in FIGS. 1-4, the middle insulator 52 is positioned between the first battery unit 21 and the second battery unit 22 below the tunnel portion 9. The front insulator 51 is positioned in front of the middle insulator 52. The rear insulator 53 is positioned in back of the middle insulator 52.

As shown in FIGS. 1-4, there is provided a connecting member 60 which interconnects, in the vehicle width direction, the first battery unit 21 and the second battery unit 22 below the middle insulator 52. Specifically, the connecting member 60 interconnects, in the vehicle width direction, between an inward side, in the vehicle width direction, of a bottom wall of the battery tray 23 of the first battery unit 21 and an inward side, in the vehicle width direction, of a bottom wall of the battery tray 23 of the second battery unit 22 (see FIG. 4).

As shown in FIG. 5, the connecting member 60 is made of a plate-shaped base member 60B through pressing, which is composed of a vehicle-width-direction connection portion 61, a slant connection portion 62, plural deformation promotion portions 63, 64, a rigidity changing portion 65, and a notch portion 66. That is, the connecting member 60 comprises the vehicle-width-direction connection portion 61, the slant connection portion 62, the plural deformation promotion portions 63, 64, the rigidity changing portion 65, and the notch portion 66.

The vehicle-width-direction connection portion 61 interconnects respective front portions of the battery units 21, 22 so as to transmit the side-collision load in the vehicle width direction from the front portion of the first battery unit 21 to a front portion of the second battery unit 22.

Further, the slant connection portion 62 interconnects the second battery unit 22 and a rear portion of the first battery unit 21. In the present embodiment, the slant connection portion 62 interconnects the front portion of the second battery unit 22 and the rear portion of the first battery unit 21 in an oblique direction.

As shown in FIGS. 5-7, a forward extension portion 61a of the vehicle-width-direction connection portion 61 which is positioned on the side of first battery unit 21 and a leftward front connection portion 67 which is positioned at a leftward end portion, in the vehicle width direction, of a rearward extension tension portion 61b are connected to the front portion of the first battery unit 21 by plural bolts B1, B2 as fixing members which are spaced apart from each other in the vehicle longitudinal direction. Specifically, the leftward front connection portion 67 is fixed to the bottom wall of the battery tray 23 which is positioned at the front portion of the first battery unit 21 by the plural bolts B1, B2.

As shown in FIGS. 5-7, a leftward rear connection portion 68 as a rear connection portion of the slant connection portion 62 which is positioned on the side of the first battery unit 21 is connected to the rear portion of the first battery unit 21 by plural bolts B3, B4, B5, fixing members, which are spaced apart from each other in the vehicle longitudinal direction.

Specifically, this leftward rear connection portion 68 is positioned on a rearward side, in the vehicle longitudinal direction, of the leftward front connection portion 67 and fixed to the bottom wall of the battery tray 23 which is positioned at the rear portion of the first battery unit 21 by the plural bolts B3, B4, B5.

As shown in FIGS. 5-7, a rightward front connection portion 69 which is positioned at a right end portion, in the vehicle width direction, of a side extension portion 61c of the vehicle-width-direction connection portion 61 which is positioned on the side of the second battery unit 22 is connected to the front portion of the second battery unit 22 by plural bolts B6, B7, B8 as fixing members which are spaced apart from each other in the vehicle longitudinal direction. Specifically, the rightward front connection portion 69 is fixed to the bottom wall of the battery tray 23 which is positioned at the front portion of the second battery unit 22 by the plural bolts B6, B7, B8. Herein, in the present embodiment, the rightward front connection portion 69 serves as a rightward front connection portion 70 as a front connection portion of the slant connection portion 62 which is positioned on the side of the second battery unit 22 as well.

As shown in FIGS. 5-7, the above-described plural deformation promotion portions 63, 64 are provided adjacently to each other at a front portion of the vehicle-width-direction connection portion 61 and configured to cause deformation when receiving the side-collision load acting in the vehicle width direction. In the present embodiment, the two deformation promotion portions 63, 64 are provided to be spaced apart from each other in the vehicle width direction.

Thereby, in the vehicle side collision, such as a pole side collision, the vehicle-width-reaction connection portion 61 of the connecting member 60 transmits the side-collision load toward the opposite side, in the vehicle width direction, of the vehicle body and also the vehicle-width-direction connection portion is caused to be bending-deformed by the plural deformation promotion portions 63, 64, whereby the side-collision energy is absorbed and the deformation of the battery unit is suppressed.

Further, since the plural deformation portions 63, 64 are provided, the vehicle-width-direction connection portion 61 is deformed at plural points, in the vehicle width direction, thereof in the vehicle side collision. Consequently, even if the battery unit is relatively displaced in the vertical direction, reduction of load input to the battery unit is attained without stretching of the connecting member 60. That is, the battery unit is suppressed from being caught between the connecting member 60 and the side sill 1, so that the deformation of the battery unit is suppressed properly.

As shown in FIGS. 5 and 8, the vehicle-width-direction connection portion 61 is constituted by a bead 71 which protrudes downwardly and this bead 71 comprises plural ridge-line portions X1, X2, X3, X4 which extend in the vehicle width direction. Since the plural ridge-line portions X1-X4 extending in the vehicle width direction are paths where the side-collision load is transmitted, the absorption quantity of the side-collision energy is improved by bending the ridge-line portions X1-X4 which is caused by the deformation promotion portions 63, 64.

As shown in FIGS. 5-7, each of the plural deformation promotion portions 63, 64 comprises a front part and a rear part which are respectively located on a forward side and a rearward side, in the vehicle longitudinal direction, of the vehicle-width-direction connection portion 61 at the same position, in the vehicle width direction, of the connecting member 60. Specifically, the deformation promotion portion 63 comprises a front deformation promotion portion 63a which is positioned on a front side of the bead 71 and a rear deformation promotion portion 63b which is positioned on a rear side of the bead 71. These front-and-rear deformation promotion portions 63a, 63b are longitudinally located at the same position, in the vehicle width direction, of the connecting member 60, interposing the bead 71 therebetween.

Likewise, the deformation promotion portion 64 also comprises a front deformation promotion portion 64a which is positioned on the front side of the bead 71 and a rear deformation promotion portion 64b which is positioned on the rear side of the bead 71. These front-and-rear deformation promotion portions 64a, 64b are longitudinally located at the same position, in the vehicle width direction, of the connecting member 60, interposing the bead 71 therebetween.

Since each of the plural deformation promotion portions 63, 64 comprises the front part (the front deformation promotion portions 63a, 64a) and the rear part (the rear deformation promotion portions 63b, 64b) which are respectively located on the forward side and the rearward side, in the vehicle longitudinal direction, of the vehicle-width-direction connection portion 61 at the same position, in the vehicle width direction, of the connecting member 60, a stress is concentrated on the deformation promotion portions 63, 64 effectively, so that the vehicle-width-direction connection portion 61 is bending-deformed securely, thereby absorbing the side-collision energy.

As shown in FIG. 5, the deformation promotion portions 63, 64 are respectively constituted by longitudinal beads 63B, 64B which protrude downwardly and extend in the vehicle longitudinal direction.

Since the deformation promotion portions 63, 64 are respectively constituted by the longitudinal beads 63B, 64B, the absorption effect of the side-collision energy is attained properly with a simple structure by bending the vehicle-width-direction portion 61 which is caused by the longitudinal beads 63B, 64B.

As shown in FIG. 5, the deformation promotion portion 64 comprises a rigidity-changing portion 65 where rigidity against an input applied in the vehicle width direction which is caused by the vehicle side collision changes at its rear side, and the deformation promotion portion 64 is integrally connected to the rigidity-changing portion 65. This rigidity-changing portion 65 is constituted by a bead which extends, in the vehicle width direction along the ridge-line portion X4 of the bead 71, from a right end portion, in the vehicle width direction, of the bead 71 to the rear deformation promotion portion 64b which is located at the middle corresponding position of the bead 71 along the ridge-line portion X4 of the bead 71 and has a so-called upward-convex structure which projects upwardly as shown in FIG. 8. The rigidity-changing portion 65 is configured to have the large rigidity against the side collision, compared to the rear deformation promotion portion 64b.

Thereby, the stress caused by the input of the side-collision load is easily concentrated on a point where the deformation promotion portion 64b is connected to the rigidity-changing portion 65, i.e., on the point where the rigidity changes, so that this rigidity-changing point functions effectively as a deformation causing point.

As shown in FIG. 5, the rearward extension portion 61b which is provided at the rear side of the vehicle-width-direction connection portion 61 comprises a notch portion 66 extending in the vehicle width direction, and the rear deformation promotion portion 63b of the deformation promotion portion 63 is integrally connected to the notch portion 66. The notch portion 66 is configured as shown in FIG. 5 such that the leftward outside, in the vehicle width direction, of the connecting member 60 is opened and its opening is closed at a point near a right end, in the vehicle width direction, of the rear deformation promotion portion 63*b*.

In a case where the connecting member 60 is bending-deformed in the vehicle side collision, it is necessary that a further rear portion of the rearward extension portion 61*b* is also bent if no notch portion exists, so that the quantity of energy for bending becomes large. According to the present embodiment, however, since the notch portion 66 exists, the connecting member 60 can be bent easily without requiring the large energy quantity. Consequently, the stretching of the connecting member 60 is suppressed without hindering the appropriate bending of the connecting member 60.

Further, as shown in FIG. 5, the deformation promotion portions 63, 64 which are connected to the front side of the vehicle-width-direction connection portion 61, specifically, the front deformation promotion portions 63*a*, 64*a* of the deformation promotion portions 63, 64 are respectively formed in a slope shape such that each rear side protrudes downwardly more.

Specifically, each of the front deformation promotion portions 63*a*, 64*a* is configured to have a triangular shape in a vehicle side view. An upper side portion of each of the front deformation promotion portions 63*a*, 64*a* which corresponds to the opposite side of the triangle is connected to the front extension portion 61*a*. A rear side portion of each of the front deformation promotion portions 63*a*, 64*a* which corresponds to the base of the triangle is connected to a front face portion of the bead 71. A lower side portion of each of the front deformation promotion portions 63*a*, 64*a* which corresponds to the hypotenuse of the triangle is connected to the front extension portion 61*a* at its front end, this lower side portion is configured in the slope shape such that its rear side protrudes downwardly more, and a rear end of the lower side portion is positioned near the ridge-line portion X2 located just below the bead 71.

Thereby, the aerodynamic performance is improved while attaining the bending deformation of the vehicle-width-direction connection portion 61 by means of the deformation promotion portions 63, 64. Specifically, underfloor traveling air added to each front-end side portion of the deformation promotion portions 63*a*, 64*a* is guided rearwardly and downwardly along the slope shape of the deformation promotion portions 63*a*, 64*a*.

If the underfloor traveling air flows into a space between the connecting member 60 and the middle insulator 52 located above the connecting member 60 (see FIGS. 3 and 4), aerodynamic energy loss may occur. According to the present embodiment, however, since the above-described traveling-air flowing into the space is prevented by the above-described slope shape, the aerodynamic performance is improved.

As shown in FIG. 5, the plural bolts B3, B4, B5 as the fixing members to connect the leftward rear connection portion 68 to the first battery unit 21 are provided to be spaced apart from each other in the vehicle longitudinal direction. At the leftward rear connection portion 68 as the connection portion of the slant connection portion 62 which is positioned on the side of the first battery unit 21, a second bead 72 which extends in the vehicle longitudinal direction closely to an inward side, in the vehicle width direction, of the bolts B3, B4, B5 of the leftward rear connection portion 68 is provided, whereby stress concentration on the specific bolt B3 is prevented and the stress is dispersed to the bolts B3, B4, B5, so that the strength reliability of the connecting member 60 is secured.

Further, as shown in FIG. 5, the plural bolts B6, B7, B8 as the fixing members to connect the rightward front connection portions 69, 70 to the second battery unit 22 are also provided to be spaced apart from each other in the vehicle longitudinal direction. The rightward front connection portions 69, 70 serve as a connection portion of the vehicle-width-direction connection portion 61 which is positioned on the side of the second battery unit 22 and as another connection portion of the slant connection portion 62 which is positioned on the side of the second battery unit 22 as well.

Moreover, a third bead 73 which extends in the vehicle longitudinal direction closely to the inward side, in the vehicle width direction, of the bolts B6, B7, B8 of the leftward rear connection portion 68 is provided, whereby stress concentration on the specific bolt B8 is prevented and the stress is dispersed to the bolts B6, B7, B8, so that the strength reliability of the connecting member 60 is secured.

Figure 9:
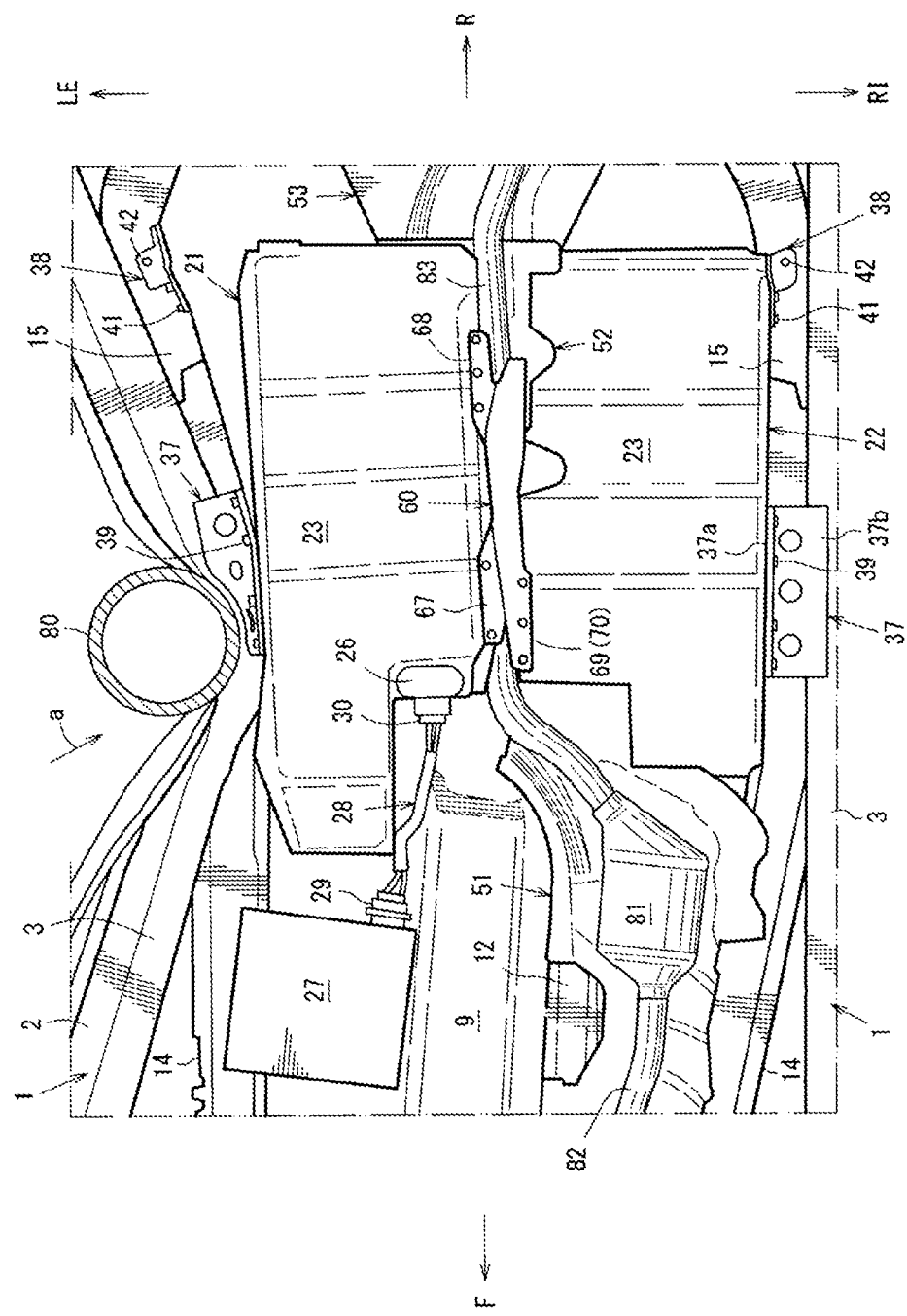
FIG. 9 is a bottom view of the lower structure of the vehicle of an embodiment, which shows a state in a vehicle side collision.
Figure 10:
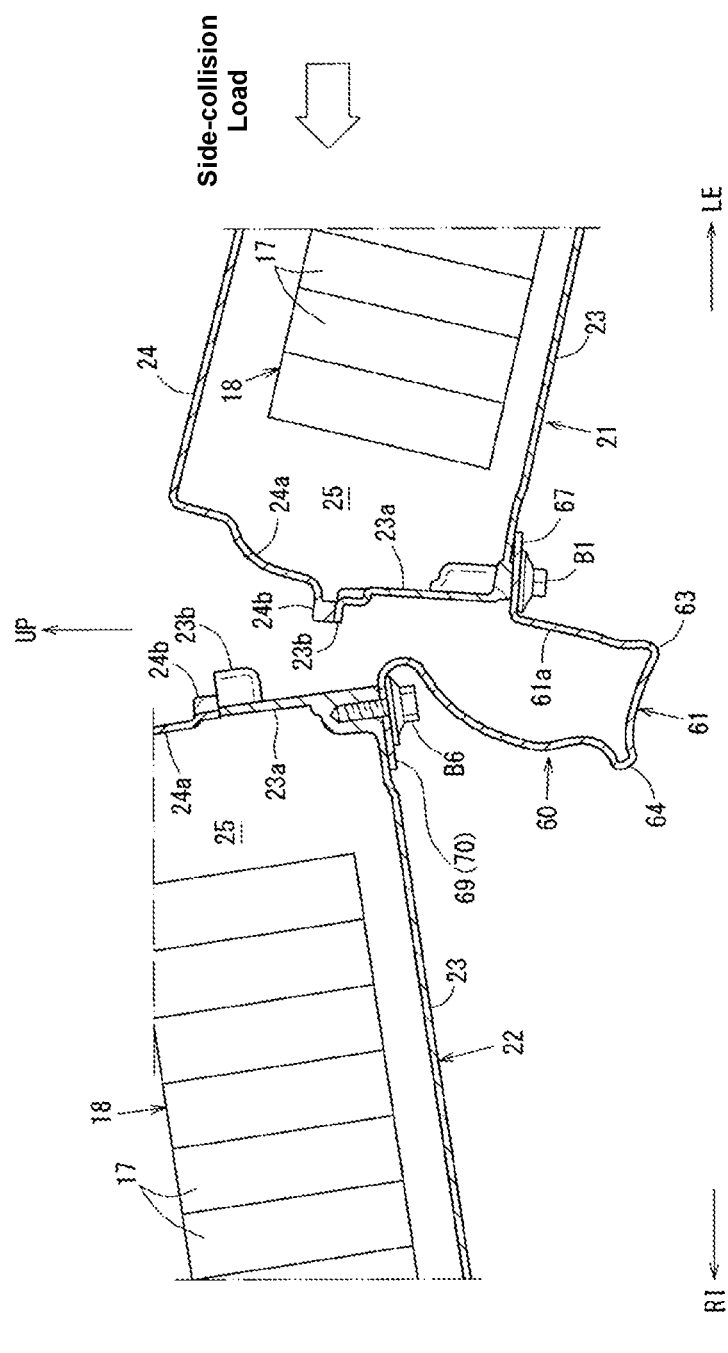
FIG. 10 is a vertical sectional view of a major part of FIG. 9.
Figure 11:
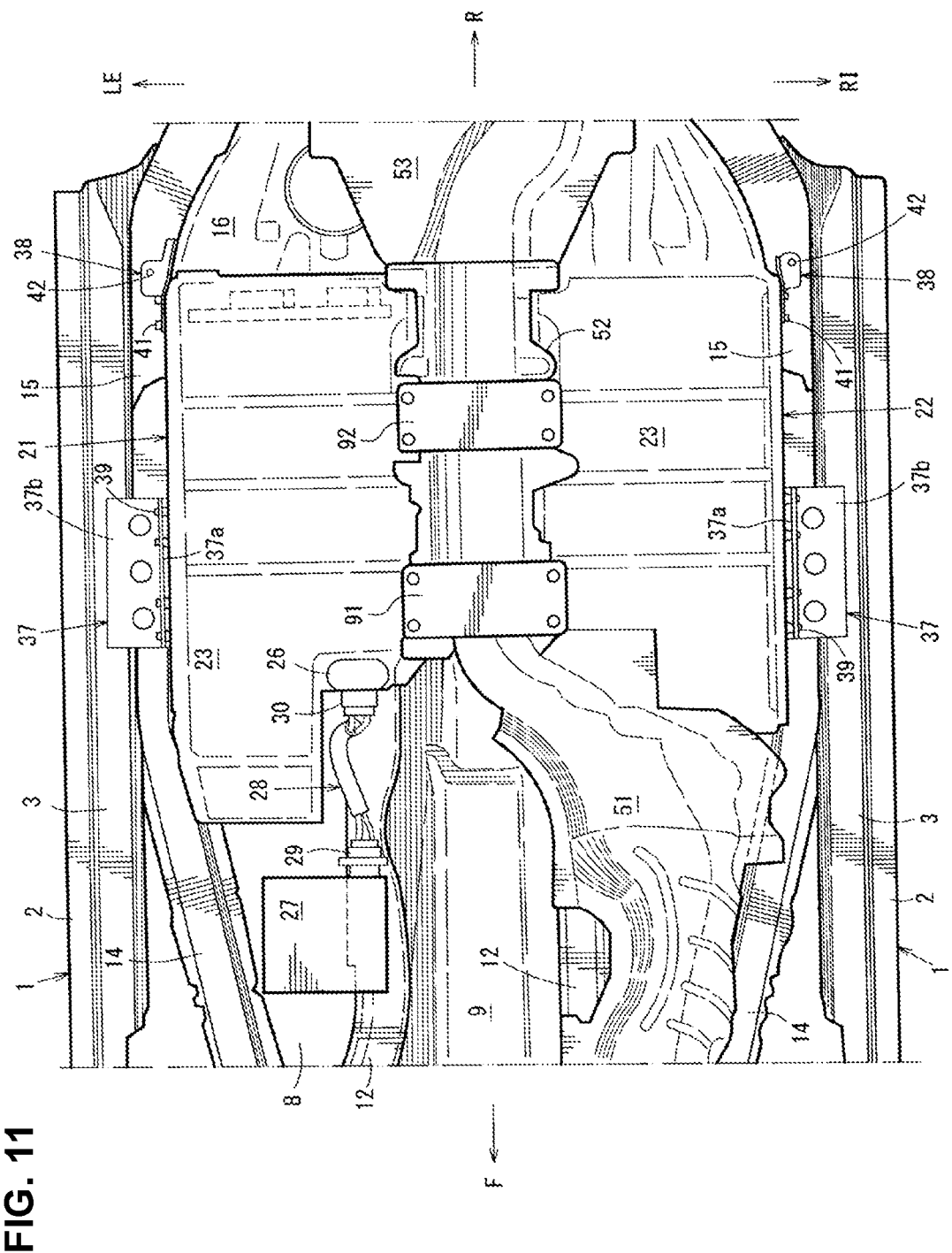
FIG. 11 is a bottom view of a lower structure of a vehicle of a comparative example.
Figure 12:
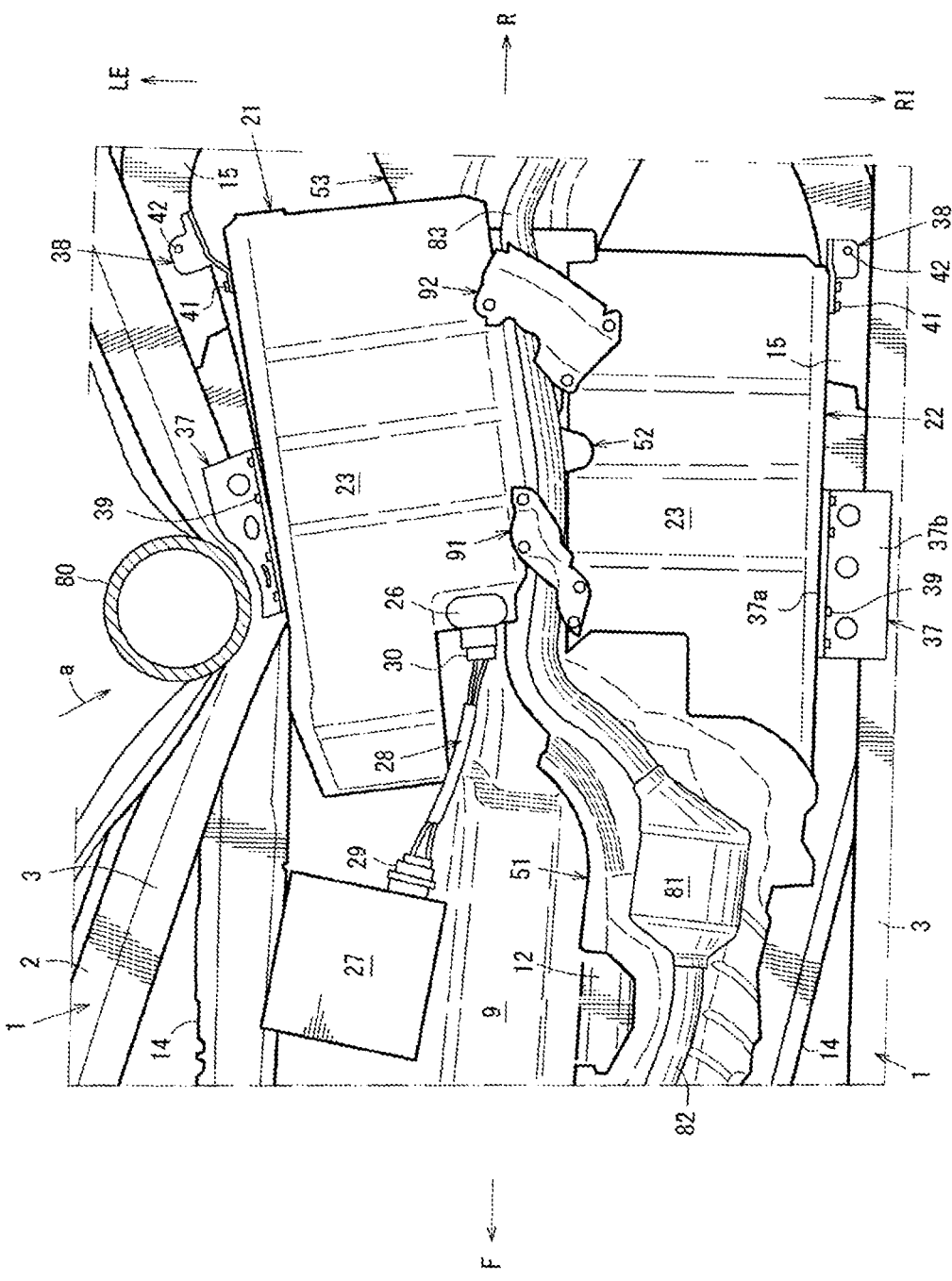
FIG. 12 is a bottom view of the lower structure of the vehicle of the comparative example, which shows a state in the vehicle side collision.
Figure 13:
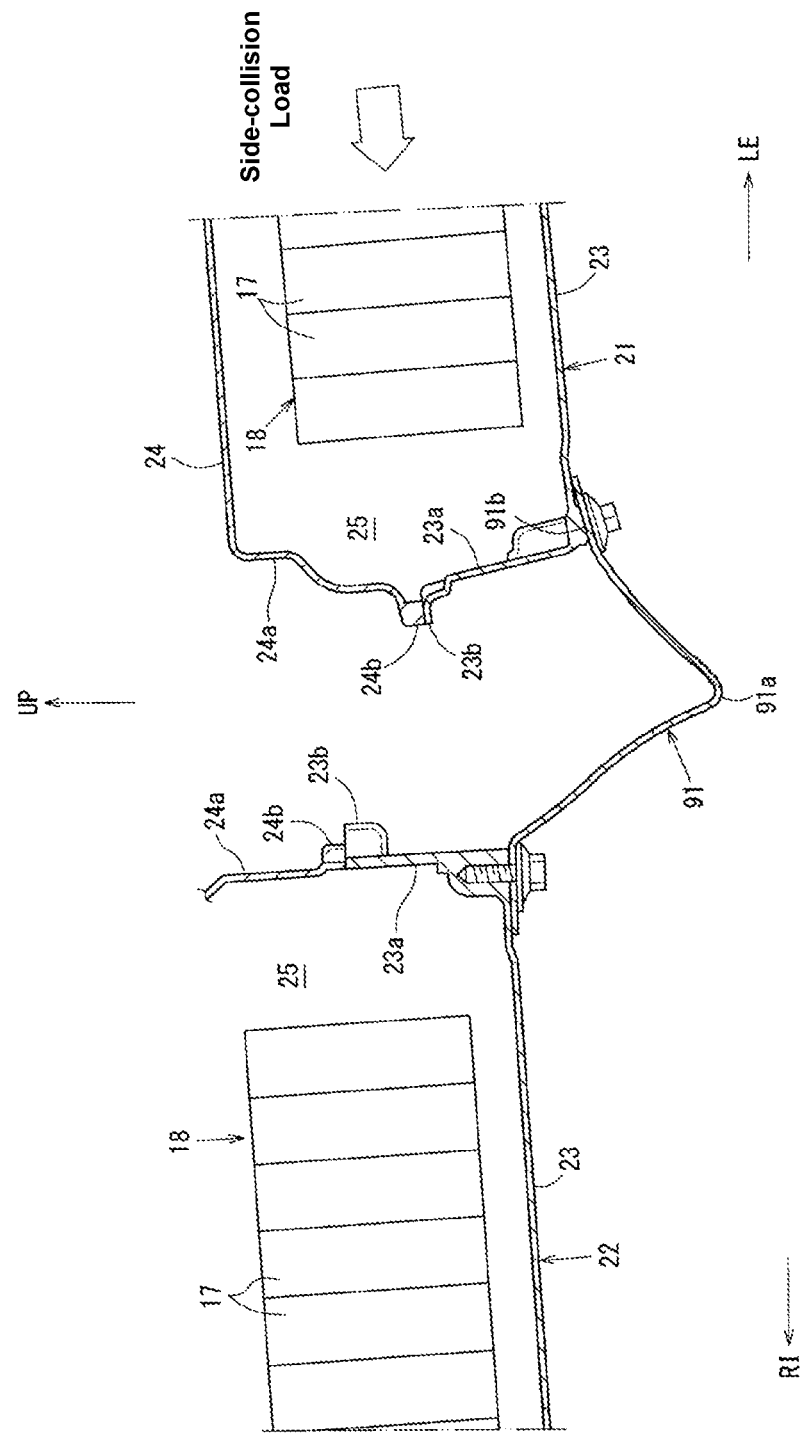
FIG. 13 is a vertical sectional view of a major part of FIG. 12.

FIG. 9 is a bottom view of the lower structure of the vehicle of the present embodiment, which shows a state in the vehicle side collision, FIG. 10 is a vertical sectional view of a major part of FIG. 9, FIG. 11 is a bottom view of a lower structure of a vehicle of a comparative example, FIG. 12 is a bottom view of the lower structure of the vehicle of the comparative example, which shows a state in the vehicle side collision, and FIG. 13 is a vertical sectional view of a major part of FIG. 12. Herein, in FIGS. 11-13, the same reference characters are used for denoting the same elements as those shown in FIGS. 1, 9, 10, specific description of which is omitted here.

In a case where a collision object 80, such as a pole, hits against a point of the vehicle body which is positioned on the forward side of the first battery unit 21 as shown in FIG. 9 from a normal state shown in FIG. 1 and thereby a side-collision load shown by an arrow a in FIG. 9 is inputted, the side sill 1 may be deformed in a V shape in a vehicle plan view.

Thereby, while the side-collision load is inputted to the first battery unit 21 from a front local point which is positioned in front of its gravity center and consequently the font side of the first battery unit 21 is forced to be rotationally displaced inwardly, in the vehicle width direction, of the vehicle, the vehicle-width-direction connection portion 61 of the connecting member 60 transmits the side-collision load toward the opposite side, in the vehicle width direction, of the vehicle body, i.e., toward the second battery unit 22, and also the plural deformation promotion portions 63, 64 cause the vehicle-width-direction connection portion 61 to be bending-deformed in an inverse-hat shape as shown in FIG. 10, so that the side-collision energy is absorbed and the deformation of the first battery unit 21 is suppressed.

Further, since the plural deformation portions 63, 64 are provided, the vehicle-width-direction connection portion 61 is deformed at plural points, in the vehicle width direction, thereof in the vehicle side collision. Consequently, even if the first battery unit 21 is relatively displaced in the vertical direction, reduction of load input to the first battery unit 21 is attained without stretching of the connecting member 60. That is, the first battery unit 21 is suppressed from being caught between the connecting member 60 and the side sill 1, so that the deformation of the first battery unit is suppressed properly.

In FIG. 9, reference character 81 denotes a catalyst convertor, reference character 82 denotes an exhaust pipe which is positioned upstream of the catalyst convertor 81, and reference character 83 denotes another exhaust pipe which is positioned downstream of the catalyst convertor 81. Compared to the structure of the present embodiment shown in FIGS. 1, 9, 10, the comparative example shown in FIGS. 11-13 is configured such that a front side of the first battery unit 21 and a front side of the second battery unit 22 is interconnected by a front connecting member 91 and a rear side of the first battery unit 21 and a rear side of the second battery unit 22 is interconnected by a rear connecting member 92. That is, in the comparative example, the respective front-and-rear sides of the battery units 21, 22 are interconnected in the vehicle width direction by the different connecting members 91, 92 which are spaced apart from each other in the vehicle longitudinal direction.

In the comparative example, the collision object 80, such as the pole, hits against a point of the vehicle body which is positioned on the forward side of the first battery unit 21 as shown in FIG. 12 from a normal state shown in FIG. 11 toward an inward side, in the vehicle width direction, of the vehicle body and thereby the side-collision load shown by an arrow a in FIG. 12 is inputted, the side sill 1 may be deformed in the V shape in the vehicle plan view.

Thereby, the side-collision load is inputted to the first battery unit 21 from a front local point which is poisoned in front of its gravity center and consequently the font side of the first battery unit 21 is forced to be rotationally displaced inwardly, in the vehicle width direction, of the vehicle. In this case, since the front side of the first battery unit 21 and the front side of the second battery unit 22 are interconnected in the vehicle width direction by the front connecting member 91, the side-collision load can be transmitted toward the opposite side, in the vehicle width direction, of the vehicle body, i.e., to the second battery unit 22, via the front connecting member 91.

However, the front connecting member 91 is bent, in the V shape in a vehicle elevational view, at a single point at a middle portion, in the vehicle width direction, thereof because of its high rigidity as shown in FIG. 13, so that the first battery unit 21 is prevented from being vertically-displaced. Thereby, the front connecting member 91 acts such that it stretches between a bent point 91a shown in FIG. 13 and a fixing point 91b of the front connecting member 91 to the first battery unit 21, so that the first battery unit 21 is caught between the front connecting member 91 and the side sill 1, so that the first battery unit 21 is improperly deformed. This is not an appropriate situation.

Compared to the comparative example shown in FIGS. 11-13, the present embodiment shown in FIGS. 1, 9, 10 can absorb the side-collision energy by making the vehicle-width-direction connection portion 61 be bending-deformed which is caused by the plural deformation promotion portions 63, 64.

As described above, the lower structure of the vehicle of the present embodiment comprises a pair of side sills 1 which are provided at the both outward sides, in the vehicle width direction, of the vehicle body and extend in the vehicle longitudinal direction, the first battery unit 21 and the second battery unit 22 which are provided below the floor panel on the respective inward sides, in the vehicle width direction, of and adjacently to the side sills 1, the first and second battery units 21, 22 being spaced apart from each other in the vehicle width direction, and the connecting member 60 which interconnects the first and second battery units 21, 22, wherein the connecting member 60 comprises the vehicle-width-direction connection portion 61 to interconnect the first and second battery units 21, 22 so as to transmit the load, in the vehicle width direction, therebetween and the plural deformation promotion portions 63, 64 which are provided adjacently to the vehicle-width-direction connection portion 61 so as to cause the deformation at the vehicle-width-direction connection portion 61 when receiving the load caused by the vehicle side collision (see FIGS. 1 and 5).

According to this structure, the vehicle-width-direction connection portion 61 of the connection member 60 transmits the side-collision load toward the opposite side, in the vehicle width direction, of the vehicle body and also the vehicle-width-direction connection portion 61 is caused to be bending-deformed by the plural deformation promotion portions 63, 64 (see FIG. 10), whereby the side-collision energy can be absorbed and the deformation of the battery unit (the first battery unit 21 in the present embodiment) can be suppressed.

Further, since the plural deformation portions 63, 64 are provided, the vehicle-width-direction connection portion 61 is deformed at the plural points, in the vehicle width direction, thereof in the vehicle side collision. Consequently, even if the battery unit (the first battery unit 21) is relatively displaced in the vertical direction, reduction of load input to the battery unit (the first battery unit 21) can be attained without stretching of the connecting member 60.

That is, the battery unit (the first battery unit 21) can be suppressed from being caught between the connecting member 60 and the side sill 1, so that the deformation of the battery unit (the first battery unit) can be suppressed properly.

In the present embodiment, each of the plural deformation promotion portions 63, 64 comprises the front part (the front deformation promotion portions 63a, 64a) and the rear part (the rear deformation promotion portions 63b, 64b) which are respectively located on the forward side and the rearward side, in the vehicle longitudinal direction, of the vehicle-width-direction connection portion 61 at the same position, in the vehicle width direction, of the connecting member 60 (see FIG. 5) According to this structure, the stress is concentrated on the deformation promotion portions 63, 64 effectively, so that the vehicle-width-direction connection portion 61 can be bending-deformed securely, thereby absorbing the side-collision energy.

In the present embodiment, the vehicle-width-direction connection portion 61 comprises the plural ridge-line portions X1-X4 which extend in the vehicle width direction (see FIGS. 5 and 8). According to this structure, since the ridge-line portions X1-X4 are paths where the side-collision load is transmitted, the absorption quantity of the side-collision energy can be improved by bending the ridge-line portions X1-X4.

In the present embodiment, the deformation promotion portions 63, 64 are constituted by the longitudinal bead 63B, 64B which protrude downwardly and extend in the vehicle longitudinal direction (see FIG. 5). According to this structure, since the deformation promotion portions 63, 64 are constituted by the longitudinal beads 63B, 64B, the absorption effect of the side-collision energy can be attained properly with a simple structure.

In the present embodiment, the deformation promotion portion 64 comprises the rigidity-changing portion 65 where the rigidity against the input applied in the vehicle width direction which is caused by the vehicle side collision changes at its rear side, and the deformation promotion portion 64 is integrally connected to the rigidity-changing portion 65 (see FIG. 5). According to this structure, since the rear side of the deformation promotion portion 64 is integrally connected to the rigidity-changing portion 65, the stress by the input of the side-collision load can be easily concentrated on a point where the deformation promotion portion is connected to the rigidity-changing portion, i.e., on the point where the rigidity changes, so that this rigidity-changing point can function effectively as a deformation causing point.

In the present embodiment, the rearward extension portion 61b which is provided at the rear side of the vehicle-width-direction connection portion 61 comprises the notch portion 66 which extends in the vehicle width direction, and the deformation promotion portion 63 is integrally connected to the notch portion 66 (see FIG. 5).

This embodiment provides the following effect. That is, in a case where the connecting member 60 is bending-deformed, it is necessary that a further rear portion of the rearward extension portion 61b is also bent if no notch portion exists, so that the quantity of energy for bending becomes large. According to this structure, however, since the notch portion 66 exists, the connecting member 60 can be bent easily without requiring the large energy quantity. Consequently, the stretching of the connecting member 60 can be suppressed without hindering the appropriate bending of the connecting member 60.

In the present embodiment, the deformation promotion portion (the front deformation promotion portions 63a, 64a) which is connected to the front side of the vehicle-width-direction connection portion 61 is formed in the slope shape such that its rear side protrudes downwardly more (see FIG. 6).

According to this structure, the aerodynamic performance can be improved by the front deformation promotion portions 63a, 64a while attaining the bending deformation of the vehicle-width-direction connection portion 61 by means of the deformation promotion portions 63, 64. Specifically, the underfloor traveling air added to each front-end side portion of the deformation promotion portions 63, 64 can be guided rearwardly and downwardly along the slope shape of the front deformation promotion portions 63a, 64a while suppressing the underfloor traveling air from flowing into the space above the connecting member 60 (see FIGS. 3 and 4), so that the aerodynamic performance can be improved.

This rigidity-changing portion 65 is constituted by a bead which extends, in the vehicle width direction, from an end portion, in the vehicle width direction, of the vehicle-width-direction connection portion 61 to the deformation promotion portion (the rear deformation promotion portion 64b and has an upward-convex structure which projects upwardly.

In correspondence of the present invention to the above-described embodiment, the deformation promotion portion to be connected to the notch portion 66 of the present invention corresponds to the deformation promotion portion 63 which is one of the plural deformation promotion portions 63, 64 of the embodiment. Likewise, the deformation promotion portion to be connected to the rigidity-changing portion 65 corresponds to the deformation promotion portion 64 which is the other of the plural deformation promotion portions 63, 64, and the deformation promotion portion to be connected to the front side of the vehicle-width-direction connection portion 61 corresponds to the front deformation promotion portions 63a, 64a. However, the present invention is not be limited to the above-described embodiment, and any other modified embodiments can be provided.

As described above, the present invention is useful for the lower structure of the vehicle in which the battery unit is provided below the vehicle floor.

What is claimed is:

1. A lower structure of a vehicle, comprising:
a pair of side sills provided at both outward sides, in a vehicle width direction, of a vehicle body and extending in a vehicle longitudinal direction;
first and second battery units provided below a floor panel on respective inward sides, in the vehicle width direction, of and adjacently to the side sills, the first and second battery units being spaced apart from each other in the vehicle width direction; and
a connecting member interconnecting the first and second battery units,
wherein said connecting member comprises a vehicle-width-direction connection portion to interconnect said first and second battery units so as to transmit a load, in the vehicle width direction, therebetween and plural deformation promotion portions provided adjacently to said vehicle-width-direction connection portion so as to cause deformation at the vehicle-width-direction connection portion when receiving the load caused by a vehicle side collision, and
wherein each of said plural deformation promotion portions comprises a front part and a rear part which are respectively located on a forward side and a rearward side, in the vehicle longitudinal direction, of said vehicle-width-direction connection portion at the same position, in the vehicle width direction, of the connecting member.

2. The lower structure of the vehicle of claim 1, wherein said vehicle-width-direction connection portion comprises plural ridge-line portions extending in the vehicle width direction.

3. The lower structure of the vehicle of claim 2, wherein said deformation promotion portion is constituted by a longitudinal bead protruding downwardly and extending in the vehicle longitudinal direction.

4. The lower structure of the vehicle of claim 3, wherein said deformation promotion portion comprises a rigidity-changing portion where rigidity against an input applied in the vehicle width direction which is caused by the vehicle side collision changes at a rear side thereof, and the deformation promotion portion is integrally connected to said rigidity-changing portion.

5. The lower structure of the vehicle of claim 4, wherein a rearward extension portion which is provided at a rear side of said vehicle-width-direction connection portion comprises a notch portion extending in the vehicle width direction, and said deformation promotion portion is integrally connected to said notch portion.

6. The lower structure of the vehicle of claim 5, wherein said deformation promotion portion which is connected to a front side of said vehicle-width-direction connection portion is formed in a slope shape such that a rear side thereof protrudes downwardly more.

7. The lower structure of the vehicle of claim 1, wherein said vehicle-width-direction connection portion comprises plural ridge-line portions extending in the vehicle width direction.

8. The lower structure of the vehicle of claim 1, wherein said deformation promotion portion is constituted by a longitudinal bead protruding downwardly and extending in the vehicle longitudinal direction.

9. The lower structure of the vehicle of claim 1, wherein said deformation promotion portion comprises a rigidity-changing portion where rigidity against an input applied in the vehicle width direction which is caused by the vehicle side collision changes at a rear side thereof, and the deformation promotion portion is integrally connected to said rigidity-changing portion.

10. The lower structure of the vehicle of claim 1, wherein a rearward extension portion which is provided at a rear side of said vehicle-width-direction connection portion comprises a notch portion extending in the vehicle width direction, and said deformation promotion portion is integrally connected to said notch portion.

11. The lower structure of the vehicle of claim 1, wherein said deformation promotion portion which is connected to a front side of said vehicle-width-direction connection portion is formed in a slope shape such that a rear side thereof protrudes downwardly more.

12. The lower structure of the vehicle of claim 4, wherein said rigidity-changing portion is constituted by a bead which extends, in the vehicle width direction, from an end portion, in the vehicle width direction, of said vehicle-width-direction connection portion to said deformation promotion portion and has an upward-convex structure which projects upwardly.

13. The lower structure of the vehicle of claim 9, wherein said rigidity-changing portion is constituted by a bead which extends, in the vehicle width direction, from an end portion, in the vehicle width direction, of said vehicle-width-direction connection portion to said deformation promotion portion and has an upward-convex structure which projects upwardly.

* * * * *